United States Patent
Howes

(10) Patent No.: US 6,933,705 B1
(45) Date of Patent: Aug. 23, 2005

(54) GENERATOR STATOR VOLTAGE CONTROL THROUGH DC CHOPPER

(75) Inventor: Lawrence H. Howes, Santa Barbara, CA (US)

(73) Assignee: Chipper Windpower Technology, Inc., Carpenteria, CA (US)

( * ) Notice: Subject to any disclaimer, the term of this patent is extended or adjusted under 35 U.S.C. 154(b) by 354 days.

(21) Appl. No.: 10/359,874

(22) Filed: Feb. 7, 2003

Related U.S. Application Data

(60) Provisional application No. 60/354,358, filed on Feb. 7, 2002.

(51) Int. Cl.[7] .................................................. H02P 9/10
(52) U.S. Cl. .............................. 322/29; 322/47; 322/32; 322/28; 322/25
(58) Field of Search ............................. 322/29, 47, 32, 322/28, 25, 21

(56) References Cited

U.S. PATENT DOCUMENTS

| | | | | |
|---|---|---|---|---|
| 5,777,459 A | * | 7/1998 | Bansal | 322/47 |
| 5,929,612 A | * | 7/1999 | Eisenhaure et al. | 322/47 |
| 6,346,797 B1 | * | 2/2002 | Perreault et al. | 322/29 |

* cited by examiner

*Primary Examiner*—Darren Schuberg
*Assistant Examiner*—Iraj Mohandesi
(74) *Attorney, Agent, or Firm*—Owen L. Lamb

(57) ABSTRACT

A method and apparatus of stator voltage control for an induction generator. Each phase of the induction generator stator is connected through a secondary coil of a transformer to a utility grid. A stator voltage control circuit is connected in parallel with a primary coil of the transformer. The stator voltage control circuit consists of an on/off switch device connected to a full wave rectifier comprised of four silicon diodes. A single pulse width modulation (PWM) control is utilized to control the on/off switch devices of each phase of the induction generator stator.

4 Claims, 2 Drawing Sheets

GENERATOR STATOR VOLTAGE CONTROL THROUGH DC CHOPPER

CROSS-REFERENCE TO RELATED APPLICATIONS

This application is related to Provisional application Ser. No. 60/354,358 of Lawrence H. Howes filed Feb. 7, 2002 entitled "Generator Stator Voltage Control Through DC Chopper" assigned to the assignee of this invention, and incorporated herein by reference.

BACKGROUND OF THE INVENTION

1. Field of the Invention

This invention relates to electric power-generating devices such as wind and ocean current turbines, and more particularly to a method and apparatus of control of the stator voltage on induction generators to allow control of the induction generator speed.

2. Description of the Prior Art

Induction generators have certain advantages over synchronous generators. Synchronous generators require separate field windings on the generator rotor which are excited by a separate DC voltage source. This makes a synchronous generator rotor complicated, asymmetrical and difficult to operate at high speeds. Induction generators do not have field windings, resulting in a more symmetrical structure. Therefore, induction generators are cheaper to manufacture and more rugged than synchronous generators. In addition, the rotor of the induction generator can "slip," which means to operate at speed of rotation greater than the AC mains frequency. If the generators stator voltage is not reduced in some manner, however, the slip is limited to a small change, (2 to 5) %, of the synchronous speed.

The current in the rotor of an induction generator is induced by the rotating stator magnetic field whenever the rotor is not at synchronous speed. The maximum speed difference or "slip" is limited by the amount of rotor current, which will cause overheating of the rotor.

It is desirable to provide an induction generator free of the above drawbacks, so as to produce an induction generator which is practical to use.

It is also desirable to provide an induction generator which can be operated easily over a wide range of speeds, with a high level of stability and with the ability to easily control such mechanical quantities as torque and speed. When the stator voltage is controllably reduced, greater speed increases are possible, up to 15%, which permits a wind turbine rotor blade to speed up during a wind gust. Speeding up in this way is very desirable, as it limits the maximum loads on the wind turbine.

SUMMARY OF THE INVENTION

Briefly, the invention is concerned with stator voltage control for an induction generator. Each phase of the induction generator stator is connected through a secondary coil of a transformer to a utility grid. A stator voltage control circuit for each phase is connected in parallel with a primary coil of the transformer for that phase. The stator voltage control circuit consists of an on/off switch device connected to a full wave rectifier comprised of four silicon diodes. A single pulse width modulation (PWM) control is utilized to control the on/off switch devices of each phase of the induction generator stator.

BRIEF DESCRIPTION OF THE DRAWINGS

The invention will be described in detail with reference to the drawings in which.

DESCRIPTION OF THE PREFERRED EMBODIMENTS

Control of the stator voltage on induction generators in wind and ocean current turbines is highly desirable. Modulation of the stator voltage allows some control of the induction generator speed, allowing for improved system control and increased efficiency. However, the prior art methods employed to achieve this result in poor power quality. The present invention describes a method of achieving stator voltage control using a DC Chopper method, which dramatically improves power quality and system stability.

Figure 1:
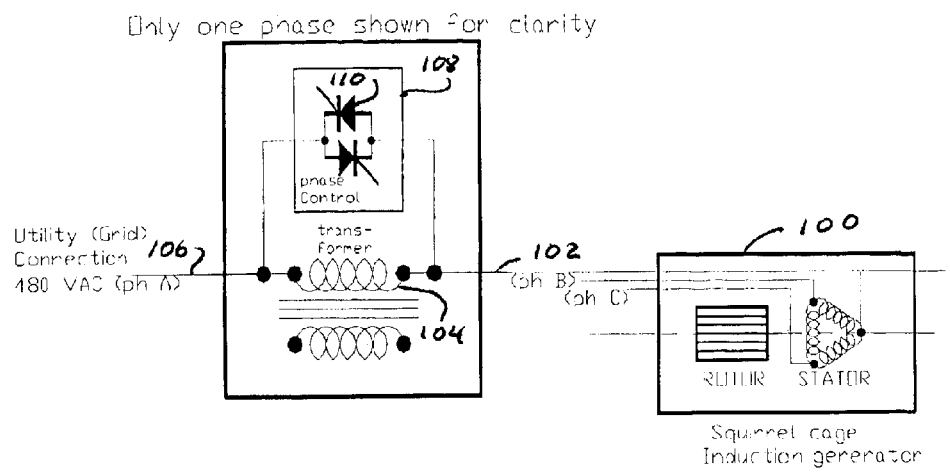
FIG. 1 is a schematic diagram of a phase control circuit of the prior art.

Refer to FIG. 1, which is a schematic diagram of a phase control method of the prior art. There are three phases, phase A, phase B and phase C. Only the phase A control is shown for clarity. The other phases are wired the same as phase A.

An induction generator 100 has its phase A output 102 connected through a transformer coil 104 to a 400 VAC utility grid 106. A phase control circuit 108 is connected in parallel with the transformer coil 104. The phase control circuit consists of an on/off semiconductor switch device comprised of two silicon-controlled rectifiers (SCRs). The phase control circuit attempts to control the generator by gating on the semiconductor switch device, at some time after the line voltage is available during each cycle of the 60 Hz AC waveform. This method of phase control is intrinsically unstable, however, because the relationship between voltage and current is not constant in an induction generator. Additional sensing and circuitry must be added to control systems applied to induction generators such as those used in wind electric turbines.

Voltage and current are almost never in phase in inductive AC circuits. The timing relationship of voltage to current is known as the phase angle. When an induction generator is connected to the power line, but not generating or under torque load (at synchronous speed) the phase angle is 90 degrees and the power factor is zero.

If the load on (or speed of) an induction generator increases, the phase angle decreases until full load rating is reached. The phase angle is typically approximately 30 degrees, yielding a power factor of 0.87.

Figure 2:
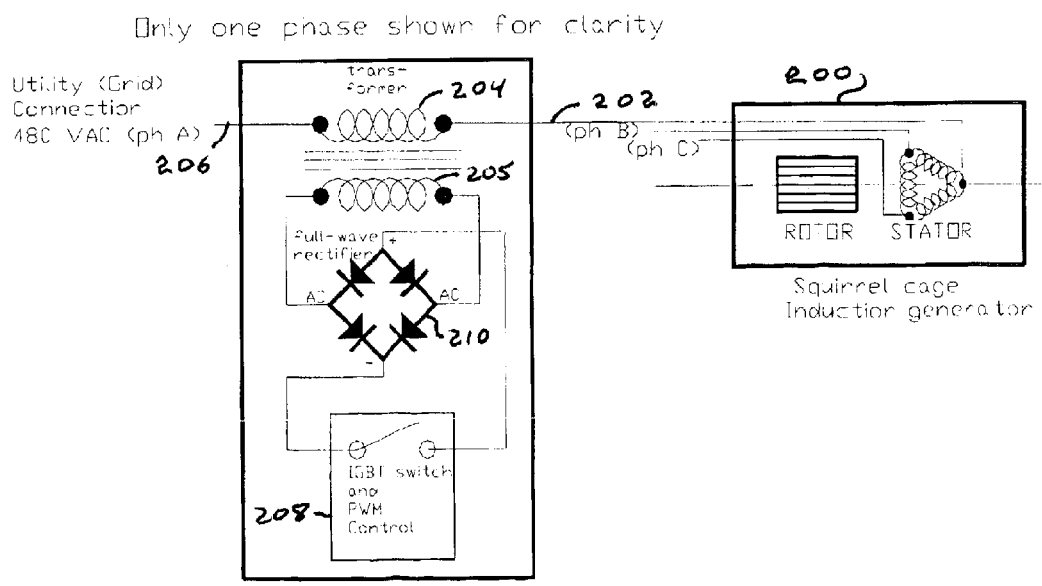
FIG. 2 is a schematic diagram of a phase control circuit of the present invention.

Refer to FIG. 2, which is a schematic diagram of the preferred embodiment of the phase control method of the present invention. There are three phases, phase A, phase B and phase C. Only the phase A control is shown for clarity. The other phases are wired the same as phase A. An induction generator 200 has its phase A output 202 connected through a secondary transformer coil 204 to a 400 VAC utility grid 206. A phase control circuit is connected in parallel with the transformer primary coil 205. The phase control circuit consists of an on/off Insulated Gate Bipolar Transistor (IGBT), switch device 208 connected to a full wave rectifier 210 comprised of four silicon diodes.

Phase control is 'chasing its tail' when trying to control an induction generator. Each change in conduction phase angle causes a change in stator voltage, which in turn causes a change in the phase angle between voltage and current in the generator. In some cases, this positive feedback can cause a latch-up condition. Existing designs attempt to anticipate this condition and compensate by altering the firing angle, with varied results.

The DC chopper method of FIG. 2 solves the stability problem. A power transistor switch 210 is used in "DC chopper mode" to control stator voltage and pulse width modulation (PWM) is applied at high frequencies (such as 18 khz). With this method the control signals are asynchronous with the ac line. The chopper circuit (which does not vary with phase angle) appears to be a load to the generator. Additionally, when controlling three-phase circuits all three phases can be controlled from the same PWM waveform that activates the IGBT Switch of each of the three phases. While the efficiency of the chopper is slightly less than the phase control (SCR) method shown in FIG. 1 due to the forward drop of the diode while in the voltage reduction mode, the control can be bypassed during full load conditions where efficiency is most critical.

Figure 3:
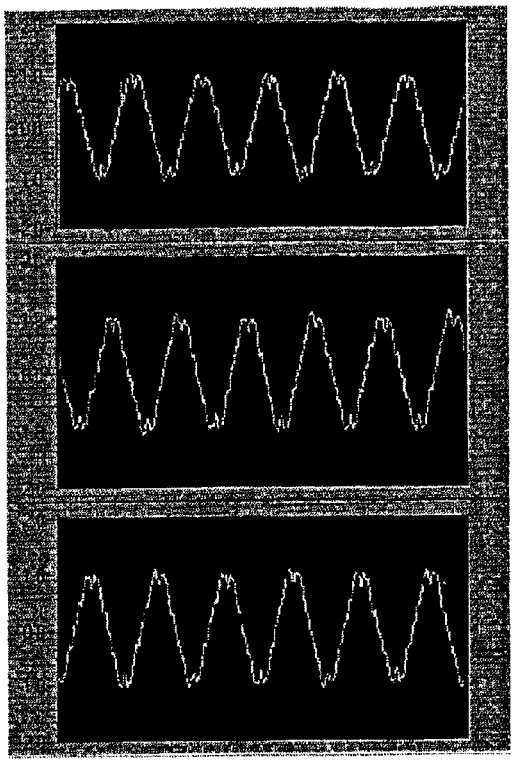
FIG. 3 is a set of three-phase SCR commutated current waveforms of the prior art; and, FIG. 4 is a set of three-phase DC Chopper commutated current waveforms of the present invention.
Figure 4:
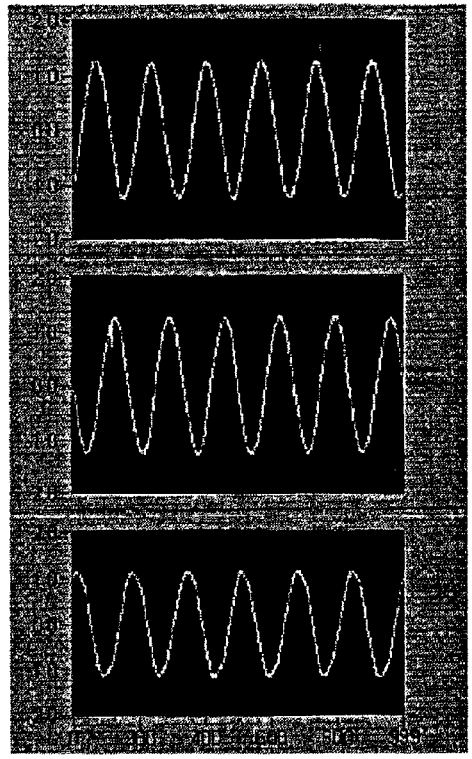

Refer to FIG. 3, which is a set of SCR commutated current waveforms when the SCR phase control method of the prior art is used and FIG. 4, which is a set of DC Chopper commutated current waveforms of the present invention.

When the DC chopper method of stator voltage control of the present invention is used, induction generator output power quality is significantly improved, as shown by the purely sinusoidal current waveforms in the FIG. 4 waveform data. The distorted current waveforms of FIG. 3 show the degraded power quality of the phase control method. The comparison waveform data shown in FIG. 3 and FIG. 4 is from a squirrel cage induction generator operating at 50% load during a laboratory comparison test.

The present control system design incorporates an embedded, real time controller. When installed on a wind or ocean current turbine, this control system is integrated into the turbine's controller.

As described above, induction generators are a desirable generator type for use as the mechanical electrical power conversion on wind or ocean current turbines. Induction units were selected due to their low cost and suitability in a wind turbine load environment. It will be understood by those skilled in the art that a wind or water current farm may be configured with any number of generators and sized for any desired power output.

While the invention has been particularly shown and described with reference to preferred embodiments thereof, it will be understood by those skilled in the art that the foregoing and other changes in form and detail may be made therein without departing from the scope of the invention.

What is claimed is:

1. A method of induction generator stator voltage control for an induction generator comprising steps of:
    A. Connecting at least one phase of said induction generator stator through a secondary coil of a transformer to a utility grid; and,
    B. Modulating a stator voltage control circuit connected in parallel with a primary coil of said transformer;
    said stator voltage control circuit consisting of an on/off switch device connected to a full wave rectifier comprised of four silicon diodes and a pulse width modulation connected to said on/off switch device.

2. A method of induction generator stator voltage control for an induction generator comprising steps of:
    A. Providing a transformer for each phase of said induction generator stator;
    B. Connecting each phase of said induction generator stator through a secondary coil of a respective transformer to a utility grid; and,
    C. Modulating stator voltage control circuits connected in parallel with a primary coil of each respective transformer;
    each of said stator voltage control circuits consisting of an on/off switch device connected to a full wave rectifier comprised of four silicon diodes and a pulse width modulation connected to said on/off switch device.

3. A induction generator stator voltage control apparatus for an induction generator comprising:
    A transformer for each phase of said stator, each transformer having a primary coil and a secondary coil;
    Each phase of said induction generator stator being connected through a secondary coil of a transformer for that phase to a utility grid;
    A stator voltage control circuit for each phase of said stator, each stator voltage control circuit being connected in parallel with a respective primary coil of a transformer for that phase; and,
    Said stator voltage control circuit consisting of an on/off switch device connected to a full wave rectifier comprised of four silicon diodes.

4. The apparatus of claim 3 further comprising:
    A single pulse width modulation (PWM) control connected to said on/off switch devices of each phase of said induction generator stator.

* * * * *